United States Patent [19]

Sano et al.

[11] 4,439,123
[45] Mar. 27, 1984

[54] INJECTION MOLDING MACHINE

[75] Inventors: Tsutomu Sano; Naoki Takeuchi; Masanobu Kurumaji, all of Kobe, Japan

[73] Assignee: Kabushiki Kaisha Kobe Seiko Sho, Kobe, Japan

[21] Appl. No.: 374,734

[22] Filed: May 4, 1982

[30] Foreign Application Priority Data

Jun. 9, 1981 [JP] Japan ................................. 56-89244
Jul. 13, 1981 [JP] Japan ........................ 56-104440[U]
Jul. 24, 1981 [JP] Japan ........................ 56-110799[U]
Aug. 18, 1981 [JP] Japan ........................ 56-122835[U]

[51] Int. Cl.³ ........................................... B29D 9/06
[52] U.S. Cl. .................................... 425/112; 425/183; 425/184; 425/185; 425/186; 425/193; 425/195; 425/347; 425/348 R; 425/561
[58] Field of Search ............... 425/112, 183, 184, 185, 425/186, 193, 195, 346, 347, 348 R, 348 S, 349, 561

[56] References Cited

U.S. PATENT DOCUMENTS

| 3,178,497 | 4/1965 | Moscicki | 425/112 X |
| 3,809,739 | 5/1974 | Gelin | 425/346 X |
| 4,205,950 | 6/1980 | Süss | 425/548 X |

Primary Examiner—Thomas P. Pavelko
Attorney, Agent, or Firm—Oblon, Fisher, Spivak, McClelland & Maier

[57] ABSTRACT

An injection molding machine having in spaced positions at least a first injecting station for injecting a plasticized resin material into a die cavity and a second station for further treating the injected resin material concurrently and in relation with the injecting operation at the injecting station, the molding machine including a die carriage movable to and from the first and second stations and fixedly supporting thereon at least a lower die of an injection molding die set; a track for guiding movements of the die carriage to and from the respective stations; a carriage clamp for fixing the die carriage at the respective stations; a die closing mechanism provided at each station for releasably clamping an upper die against the lower die; and a drive mechanism for moving the die carriage sequentially to the first and second stations.

19 Claims, 25 Drawing Figures

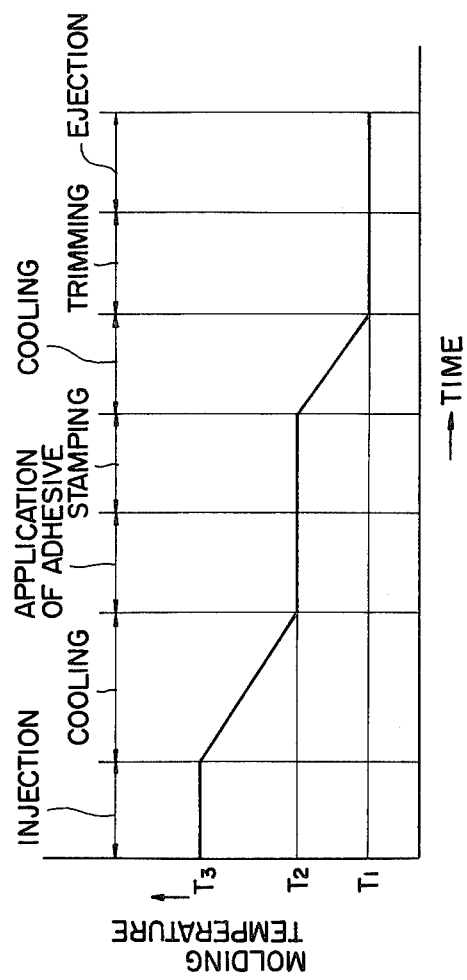

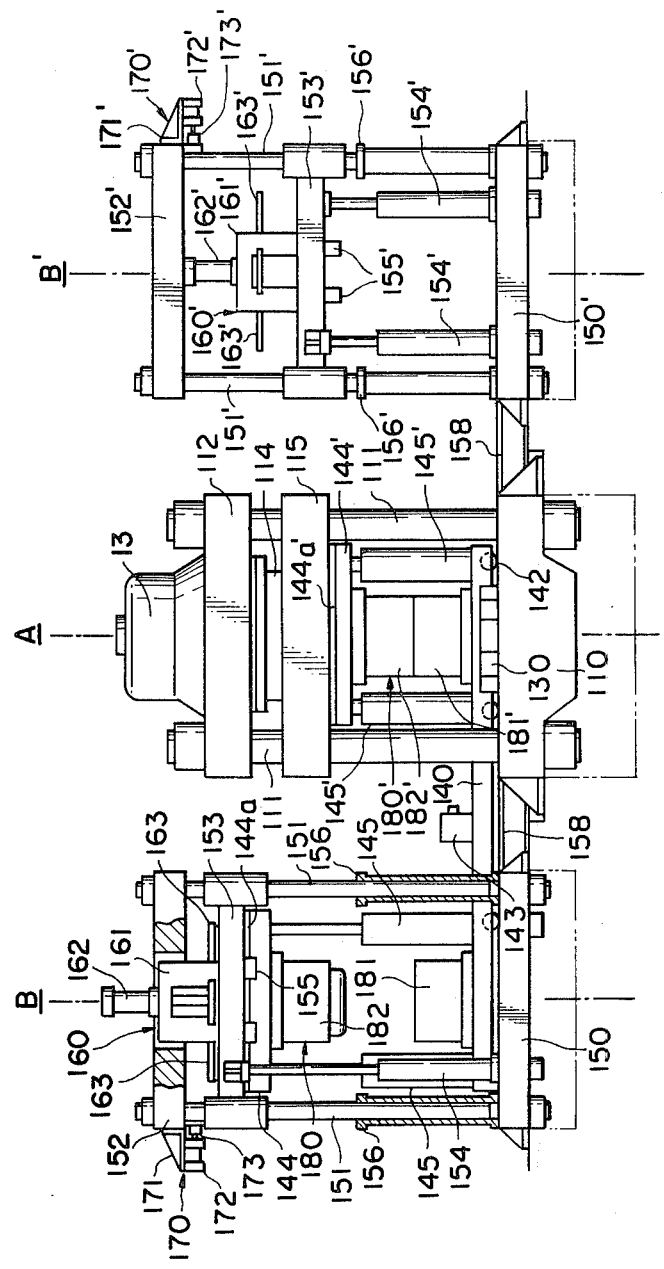

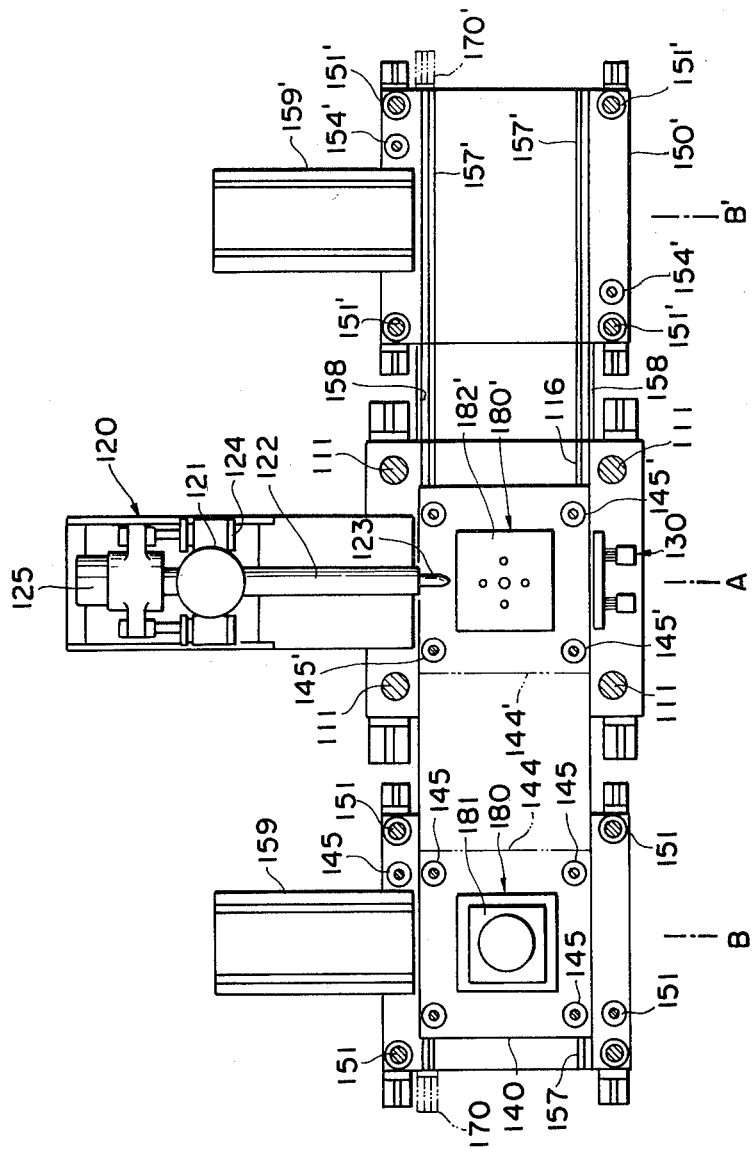

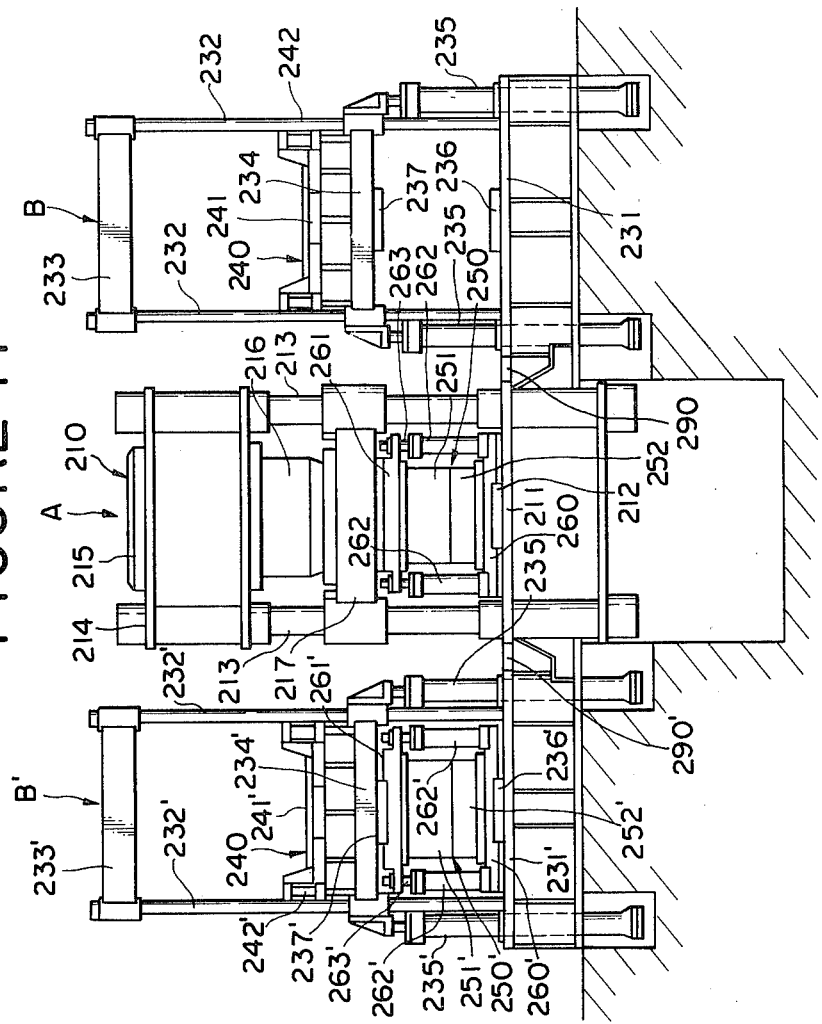

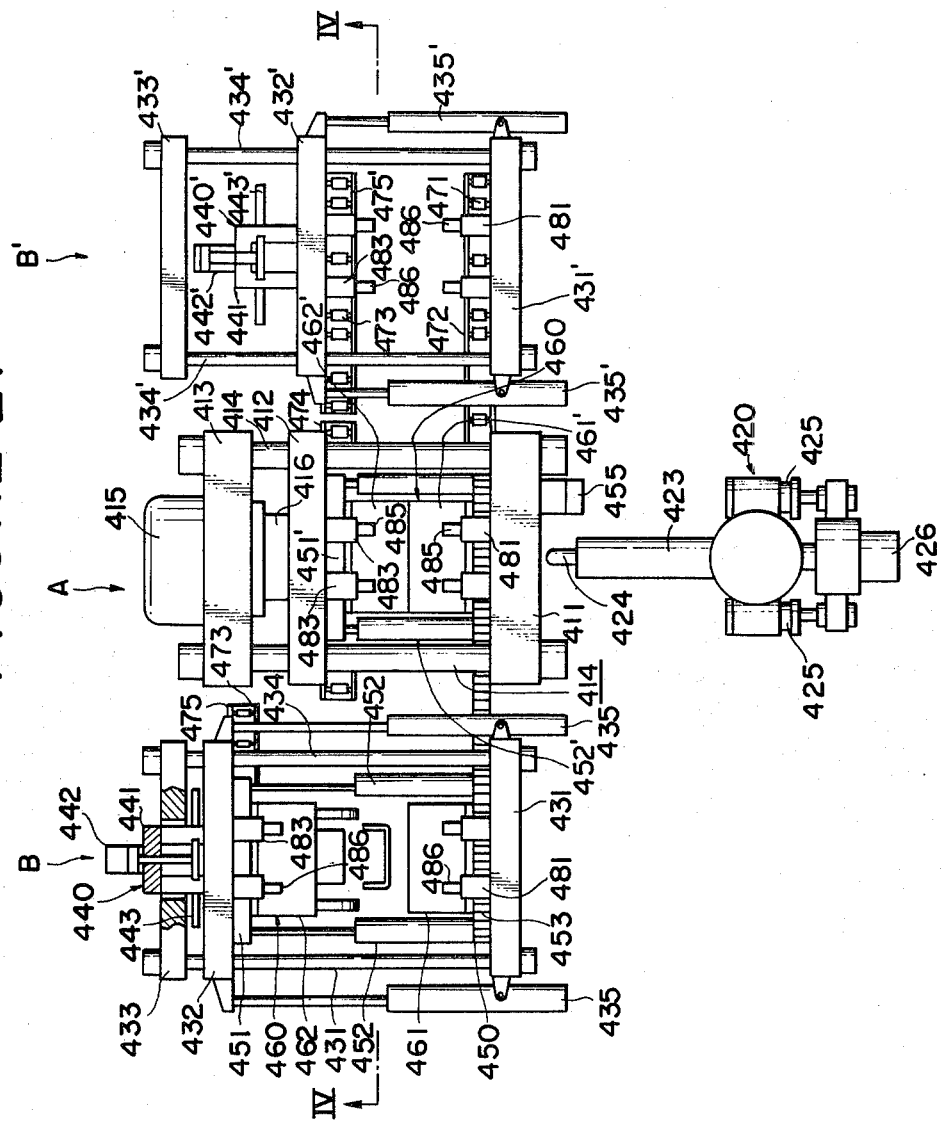

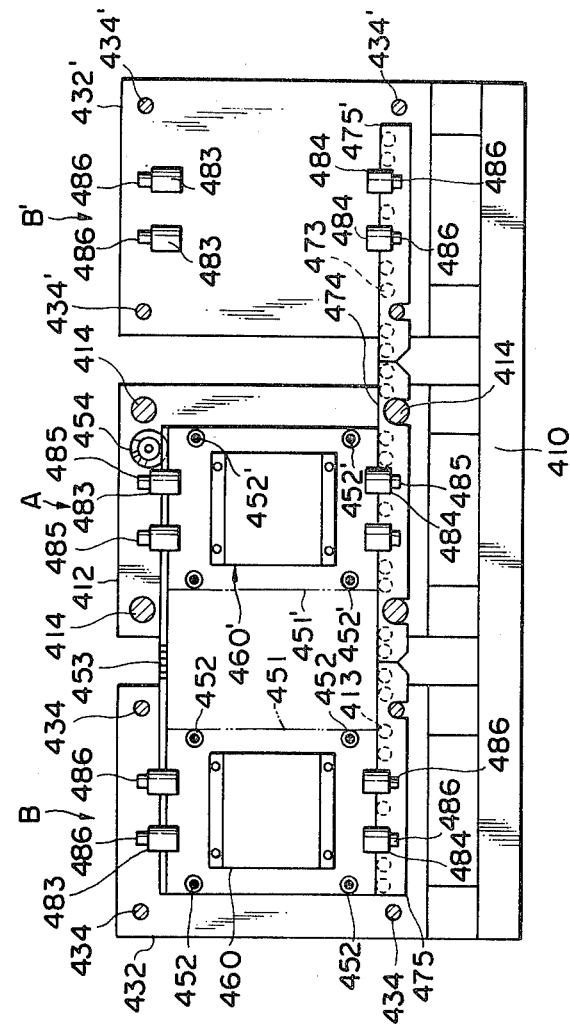

INJECTION MOLDING MACHINE

BACKGROUND OF THE INVENTION (1) Field of the Invention

This invention relates to injection molding machines, and more particularly to a systematized injection molding machine employing a die carriage for transferring a die set or sets to and from an injecting station and at least a station which performs a post-injection treatment in a continuous injection molding process.

(2) Description of the Prior Art

Injection molding is employed widely for the production of various articles, for example, for the production of multi-layered resinous sheet materials for instrument panels or door panels of motor vehicles, which are usually composed of an injection-molded base material M and a facing material F which is adhered integrally on the surface of the molded material M and which consists of a cushioning layer $F_1$ of a foamed synthetic resin and a decorative skin layer $F_2$ of polyvinyl chloride or the like as shown particularly in FIGS. 2 and 3.

Heretofore, the multi-layered resinous moldings of the above-mentioned construction have been produced by a process as illustrated in FIG. 1. Namely, in the first stage, a base material is produced by injection molding by the use of an injection molding machine and a die therefor. The molded base which is ejected from a die is then fixed on a jig of an adhesive applicator and coated with an adhesive on its surfaces. After predrying the coated adhesive, the base material is fed to a stamp press machine and set on a jig of the machine, preheating the upper and lower dies of the press machine, and then a facing material is fed to the machine in a similar manner to adhere the same on the surface of the molded base material by stamp pressing. The base molding covered with the facing material is then removed from the stamp press and fed to a trimmer where protruding hems of the facing material are trimmed off to obtain a predetermined multi-layered resin molding.

In the conventional process described above, the operations in the respective stages are performed independently of each other, so that it has been necessary to provide in each stage a jig for fixing the molded material to be processed. In addition, different die sets are used respectively in the injection molding machine, stamp press and trimmer, completely ejecting the molded material from the die of the molding machine after injection molding for transfer to the stamp press. It follows that there has to be employed a molding machine with a die clamp mechanism of large capacity and stroke length for the ejection of the molded article, thus incurring a high equipment cost. Moreover, the plasticized resinoid which is injected at a temperature of $T_3$ has to be cooled sufficiently down to a temperature $T_1$ in the stage of injection molding to permit ejection of the molded material, heating again the material to a level $T_2$ from the ejection temperature $T_3$ for predrying the coated adhesive or in preparation for the stamp pressing, resulting in a redundant production cycle with large heat and time losses and thus in a high production cost.

SUMMARY OF THE INVENTION

It is an object of the present invention to provide a systematic injection molding machine which is arranged to perform a series of operations of an injection molding process in a drastically shortened cycle time.

It is another object of the present invention to provide a systematic injection molding machine employing a die carriage to transfer a die set or die sets to and from an injecting station and at least another station where a post-injection treatment is performed, thereby shortening the cycle time of the injection molding to a considerable degree.

It is a further object of the invention to provide a systematic injection molding machine which is simple and compact in construction and which permits facilitated maintenance and service.

It is a further object to provide a molding machine which requires a die closing cylinder or cylinders of a reduced stroke length.

According to the present invention, there is provided an injection molding machine having in spaced positions at least a first injecting station for injecting a plasticized resin material into a die cavity and a second station for further treating the injected resin material concurrently and in relation with the injecting operation at the injecting station, the molding machine comprising: a die carriage movable to and from the first and second stations and fixedly supporting thereon at least one die half of an injection molding die set; track means for guiding movements of the die carriage to and from the respective stations; carriage clamp means for fixing the die carriage at the respective stations; a die closing mechanism provided at each station for releasably clamping the other die half against the die half on the carriage; and drive means for moving the die carriage sequentially to the first and second stations.

According to one aspect of the present invention, the injection molding machine comprises: a wheeled carriage movable sequentially from a first to third station and fixedly supporting thereon one die half of the die set; an injection molding machine located at the first station and supporting on the die closing mechanism the other die half of the die set; a stamp press located at the second station for stamp-pressing a sheet material on a molding transferred from the first station by the die carriage and supporting on the die closing mechanism a stamp press die conforming with the die half on the carriage; a trimming machine located at the third station for trimming off protruding hem portions of the stamp-pressed sheet material and having on the die closing mechanism a trimming cutter conforming with the die half on the carriage; and rail tracks laid between and through the respective stations.

The above and other objects, features and advantages of the present invention will become apparent from the following description and the appended claims, taken in conjunction with the accompanying drawings which show by way of example preferred embodiments of the invention.

BRIEF DESCRIPTION OF THE DRAWINGS

In the accompanying drawings:

FIG. 13 is a view similar to FIG. 1 but showing a series of steps in the same molding process by the molding machine according to the present invention;

FIG. 14 is a schematic front view of another embodiment of the present invention;

FIG. 15 is a schematic plan view of the molding machine shown in FIG. 14;

FIG. 17 is a schematic front view of a further embodiment of the present invention;

FIG. 21A is a schematic plan view of a horizontal injection molding machine embodying the present invention;

FIG. 22 is a schematic sectional view taken on line IV—IV of FIG. 21A; and

DETAILED DESCRIPTION OF THE PREFERRED EMBODIMENTS

Figure 1:
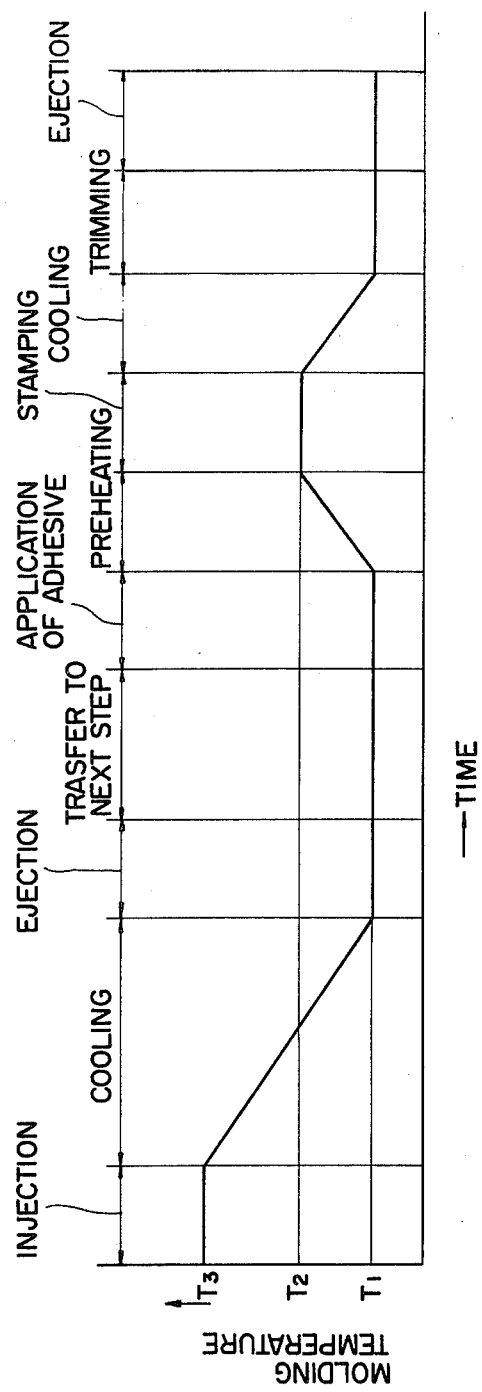
FIG. 1 is a diagram showing a series of steps involved in an injection molding process by the conventional machine.

FIGS. 4 to 13 show a systematic molding machine for producing a multi-layered resinous molding according to the present invention. As seen particularly in FIG. 4 which illustrates the general arrangement of the system, an injection molding machine 1, a stamp press 2 and a trimmer 3 are installed on a floor at intervals along a path of travel of a die carriage 5 which is movable on and along floor rails 4.

The injection molding machine is of the vertical type and includes a base 11, a die closing cylinder 12, a die closing ram 19, tie rods 13, a die head 14, a screw cylinder 15, a screw drive mechanism 16, an injecting cylinder 17 and a lift cylinder 18. The upper half of the die halves 6 and 7 of the molding machine 1 is a female die 6 fixedly mounted on the die head 14 to serve exclusively for the injection molding, while the lower male die 7 is mounted on the carriage 5 to serve as a lower die common to the respective machines 1 to 3. The carriage 5 is of a self-driving type and provided with a drive motor 51 and wheels 52 to run on and along the floor rails 4, transferring the lower male die 7 sequentially to the respective machines 1 to 3. Of course, the carriage 5 is not limited to the self-driving type and may be of a tow type which is moved by a trolley chain or the like.

Figure 2:
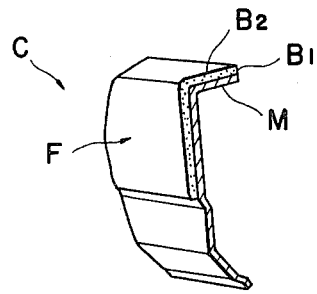
FIG. 2 is a perspective view of a multi-layered molded resinous material taken as an example.
Figure 3:
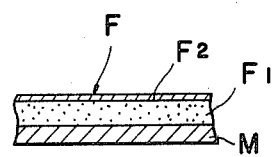
FIG. 3 is a fragmentary sectional view of the material shown in FIG. 2.
Figure 4:
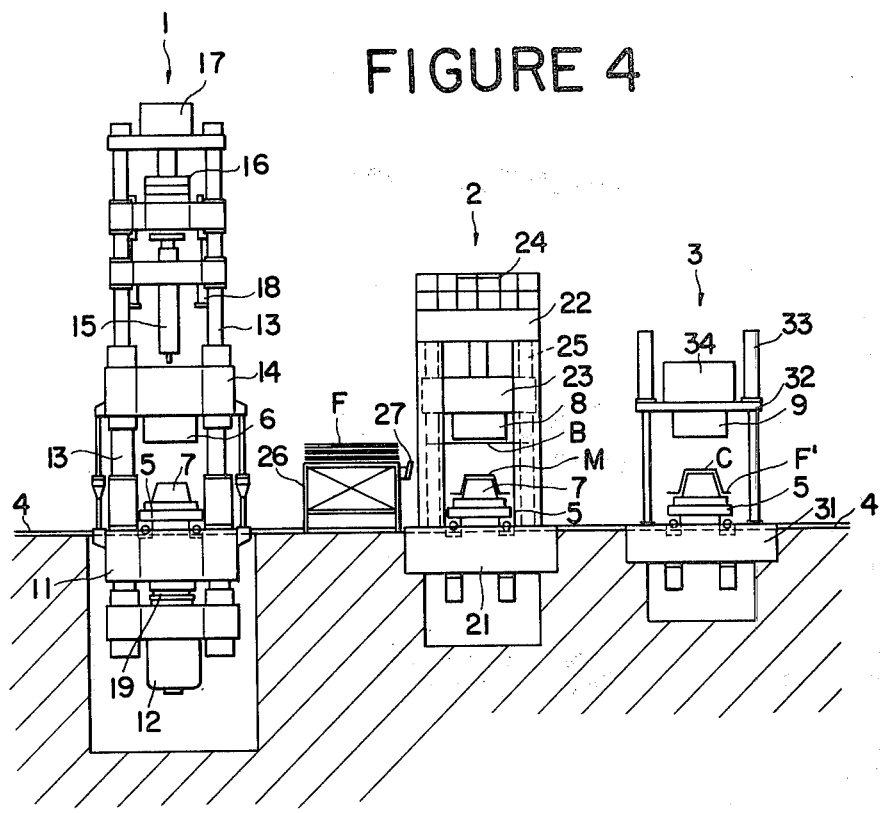
FIG. 4 is a general view of a systematic injection molding machine according to the present invention.

The stamp press 2 is basically constituted by a base 21, a gate-like column 22, a press head 23, press cylinder 24 and tie rods 25, securely mounting on the press head 23 an upper die 8 which conforms with the common lower die 7. Provided on one side of the press machine 2 are a gate-shaped frame 26 for supporting a stack of blank facing sheets F shown in FIGS. 2 and 3, a facing sheet feeder (not shown) for feeding the blank facing sheets F on the support frame 26 one by one to the press machine 2, and an adhesive applicator 27 for applying an adhesive on the back side of each blank facing sheet F.

The trimmer 3 is basically constituted by a base 31, a cutter head 32, a lift cylinder 33 and a heat control panel 34, mounting fixedly on the cutter head 32 a trimming cutter 9 which also conforms with the common lower die 7.

Provided on the bases 11, 21 and 31 are fixed rails 41, 41' and 41'', respectively, which are positioned in alignment with the floor rails 4, and movable rail segments 42, 42' and 42'' which are mounted on lift cylinders 43, 43' and 43'' in recesses 44, 44' and 44'', respectively, for movement between a lowered or sunken position and an upper or lifted position level with the fixed rails 42, 42' and 42''.

In operation, the common lower die 7 is mounted on the carriage 5 in the first place, and then the drive motor 51 is actuated to drive the carriage wheels 52, advancing the carriage 5 into the injection molding machine 1. At this time, the rail segments 42 on the base 11 is initially maintained in the lifted position level with the fixed rails 41 to let the vehicle 5 move onto the base 11. After once stopping the carriage 5 on the base 11 with the vehicle wheels 52 on the movable rail segments 42, the lift cylinder 43 is actuated to retract the movable rail segments 42 into the recess 44, lowering the carriage wheels 52 until the lower side of the vehicle body rests on the base, and the carriage 5 is fixed on the base 11 by actuating fixing means (not shown). (See FIG. 4.)

In the next phase of operation, the upper die 6 is lowered and fittingly closed on the lower die 7 on the carriage 5 and, after clamping the upper and lower dies 6 and 7 to each other, a plasticized resinoid is injected into the cavity defined by the die halves 6 and 7 to obtain a molding of a predetermined shape. (See FIG. 6.)

A pin plate 72 with knock-out pins 71 which is vertically movably provided in the die assembly 7 is engageable with knock-out pins 53 which are in turn vertically movably provided on the vehicle 5 to push up the pin plate 72. The knock-out pins 53 are held in retracted positions by springs 54 during the in injection molding stage and until the ejecting stage which will be described hereinafter, pushing the knock-out pins 71 of the pin plate 72 into the lower retracted position.

Figure 5:
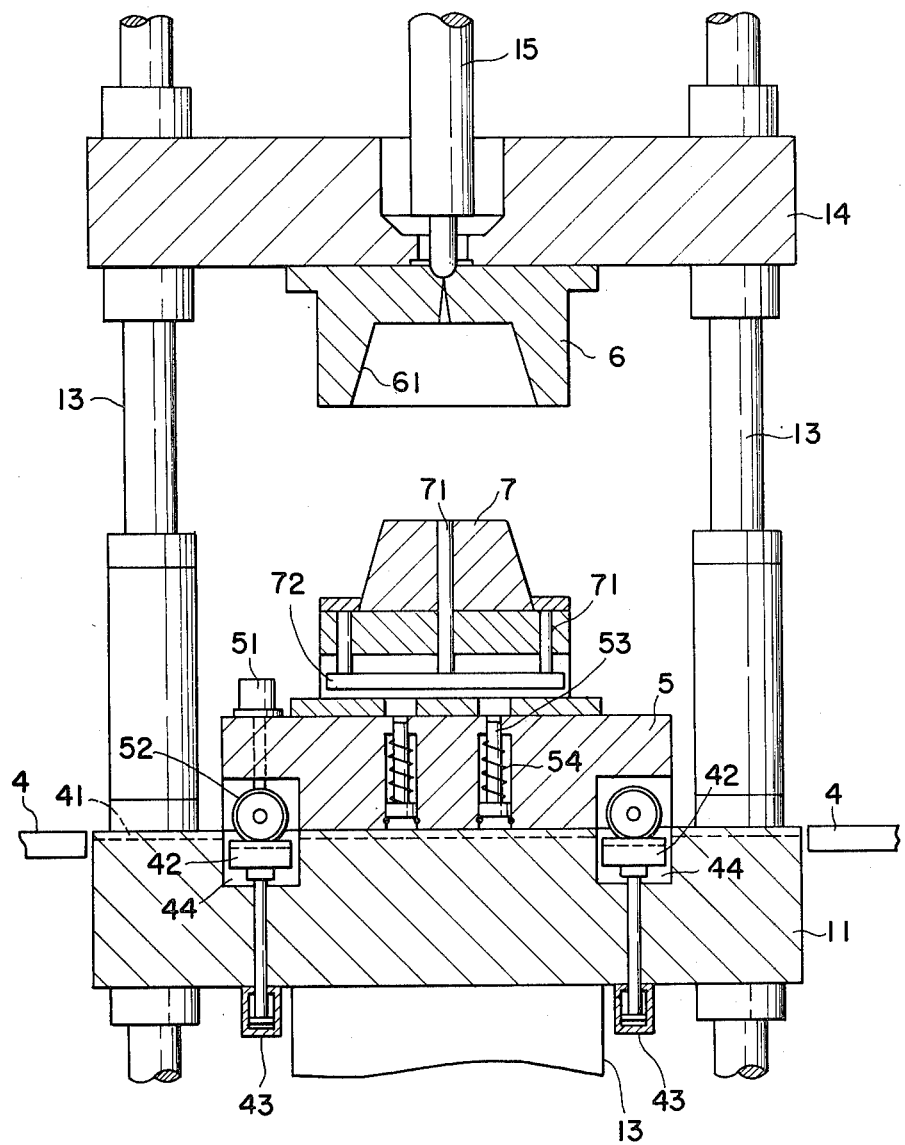
FIG. 5 is a vertically sectioned schematic front view of a die carriage in an injecting station.
Figure 6:
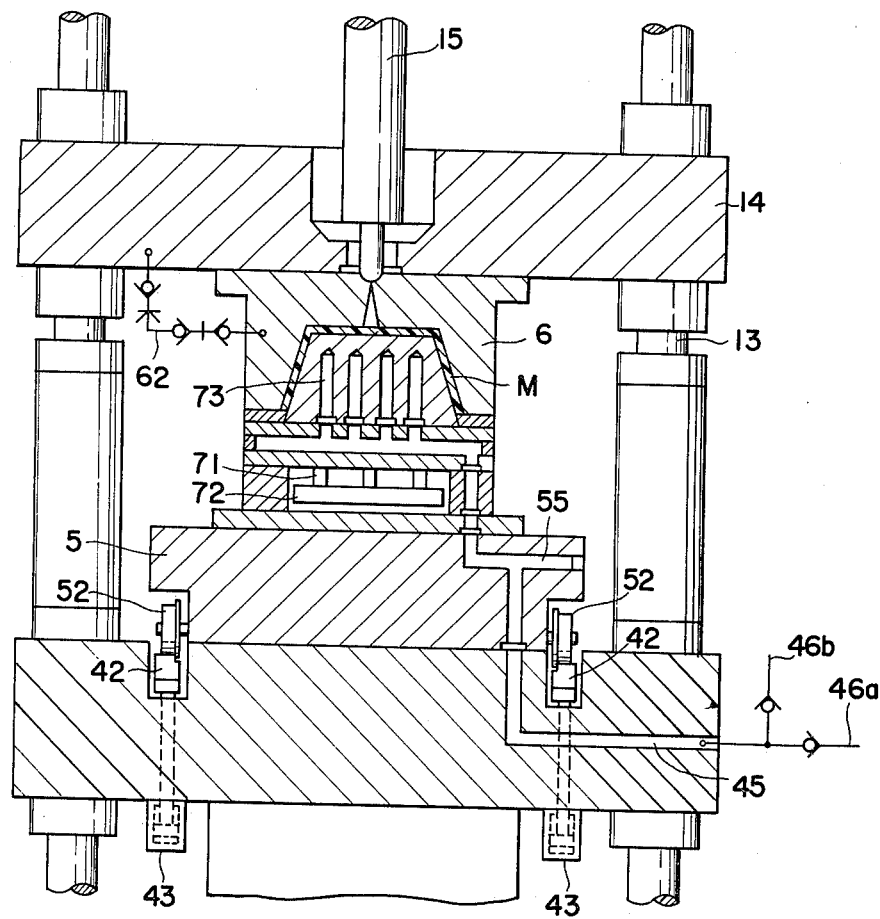
FIG. 6 is a vertically sectioned schematic side view of the die carriage undergoing injection at the injecting station.

As shown particularly in FIG. 5, the lower die assembly 7 and the carriage 5 are provided with passages 73 and 55, respectively, for selectively passing therethrough cooling water, cooling water purging air and heating steam which are selectively supplied through a passage 45 in the base 11. When the lower die assembly 7 is mounted on the vehicle 5, the passages 73 are communicated with the passage 55. In turn, the passage 55 is communicated with the passage 45 when the carriage 5 is fixed on the base 11. In the stage of injection molding, after injecting a plasticized resinoid into the cavity of the dies 6 and 7 which are maintained in closed state, cooling water is supplied to the above-mentioned passages 45, 55 and 73 from one inlet port 46a of the base 11 to cure the resin. On the part of the die head 14, cooling water is also fed to water passages shown around the cavity 61 of the upper die 6 through piping 62. The piping 62 may be provided through the bodies of the die head 14 and upper die 6 if desired.

Figure 7:
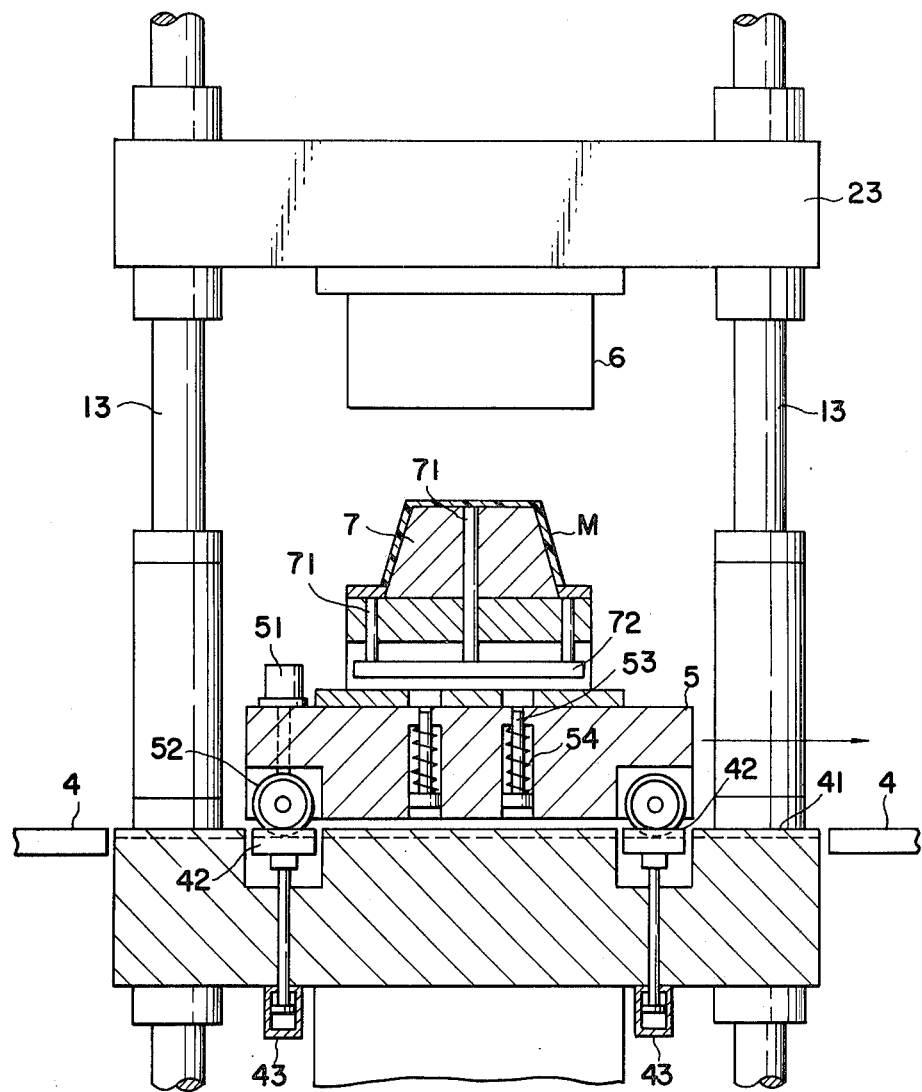
FIG. 7 is a vertically sectioned front view of the die carriage immediately after the injection.
Figure 8:
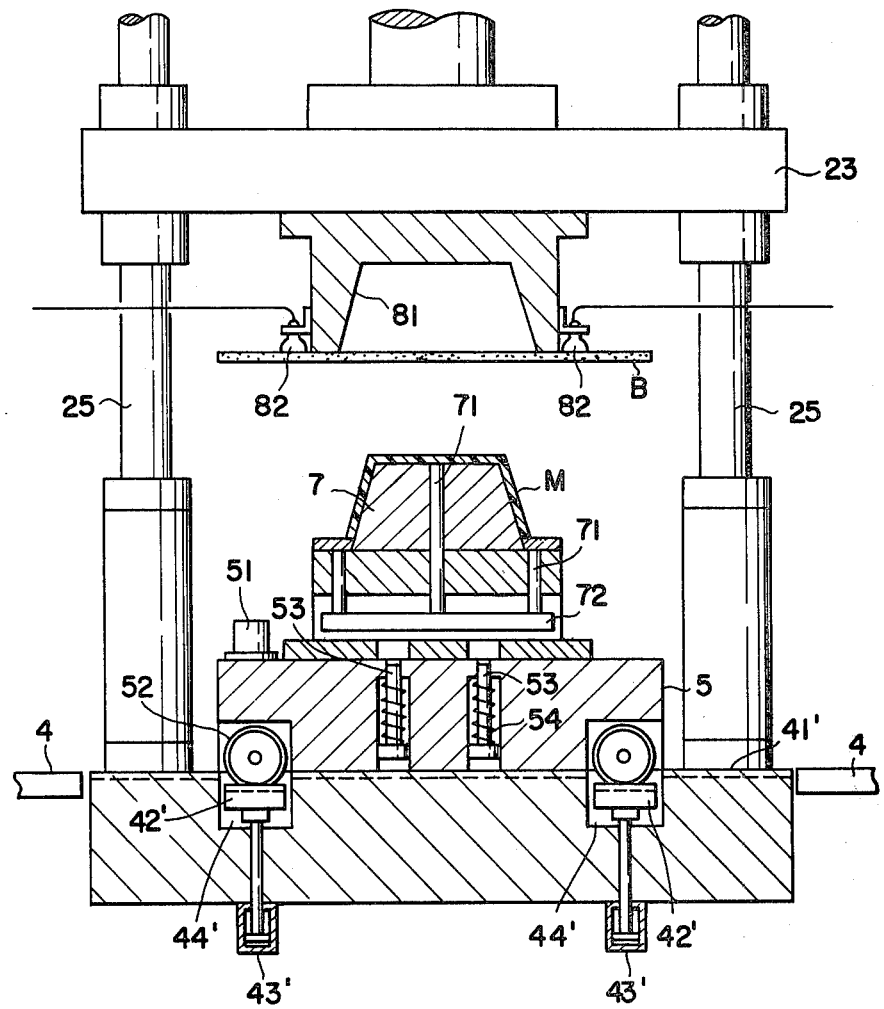
FIG. 8 is a vertically sectioned schematic front view of a stamp press.

The plasticized resin thus injected into the die cavity is cooled for a predetermined time period for curing the resin and, after releasing the clamping force, the upper die 6 is lifted as shown in FIG. 7 to open the dies. Before or after this step, the supply of cooling water is stopped and instead air is supplied through the other inlet port 46b of the base 11 to drain cooling water in the passages 45, 55 and 73, and then the lift cylinder 43 is actuated to lift the movable rail segments 42 up to the level of the fixed rails 41. Thus, the carriage 5 is also lifted up to the travel surface. The motor 51 is then actuated to move the carriage wheels 52 on the rail segments 42 onto the fixed rails 41 and then onto the floor rails 4, thus moving the carriage 5 out of the molding machine, with the molded article M still being stuck on the lower die 7 which is mounted on the vehicle 5.

In the next stage, the carriage 5 is moved into and stopped at the stamp press 2. In a manner similar to the fixation in the molding machine 1, the body of the vehicle 5 on the movable rail segments 42' is lowered onto the base 21 by retracting the movable rail segments 42' into the sunken position through the lift cylinder 43', and fixed on the base 21. Concurrently with the fixation of the vehicle 5, one of the blank facing sheets B which are stocked on the stacking table 26 is fed to a position beneath the upper die 8 of the stamp press by a facing sheet feeder (not shown). At this time, an adhesive is applied to the back side of the facing sheet F by the adhesive applicator 27 which is provided on the stacking table 26. In this connection, the adhesive applicator may be located between the molding machine 1 and stamp press 2 to apply an adhesive on the surface of the molded article M on the lower die 7 in the course of transfer to the stamp press 2 by the carriage 5.

Figure 9:
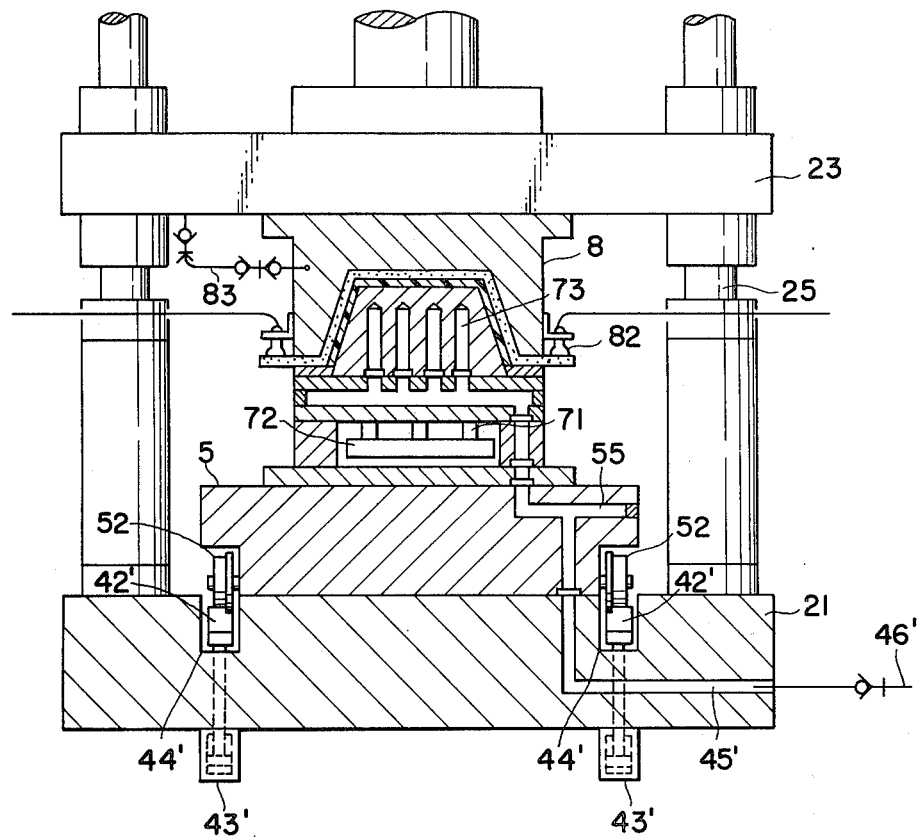
FIG. 9 is a vertically sectioned schematic side view of the stamp press, showing the stamp pressing operation by the press.

The upper die 8 is likewise provided with a cavity 81 of a complementary shape for the stamp pressing operation and has a number of suction members 82 on its outer periphery for holding by suction the facing sheet F which is fed to a position beneath the upper die 8. The press head 23 and upper die 8 with the held facing sheet F are lowered by operation of the press cylinder 24, fittingly engaging the upper die 8 with the lower die 7 on the vehicle 5 to press and bond the facing sheet F securely on the surface of the molded material M with the aid of the adhesive. Concurrently with the downward movement of the upper die 8, hot steam is supplied to passages (not shown) which are provided in the walls around the cavity 81 through piping 83 on the press head 23 to heat the upper die 8 to a certain extent, as shown in FIG. 9. The piping 83 may be provided internally within the press head 23 and upper die 8 if desired. On the other hand, the passage 55 in the vehicle 5 is connected to the passage 45' in the base 21 when it is fixed thereon, through which hot steam is supplied to passages 73 in the lower die 7 concurrent with the downward movement of the upper die 8 to heat the lower die 7 to some extent. Thus, the upper and lower dies 8 and 7 are mated in a heated state to bond the facing sheet F securely on the surface of the molded material M.

Figure 10:
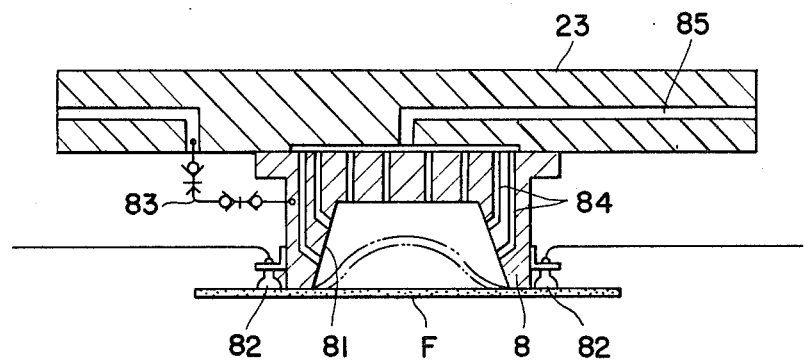
FIG. 10 is a vertical section of a stamp die upper die of a modified construction.

In the above-described stamp pressing stage, if the upper die 8 has a deep cavity 81, it is advisable to provide suction passages 84 in the upper die 8 and press head 23 in communication with the die cavity 81 as shown particularly in FIG. 10 to reduce the pressure in the cavity 81 thereby preforming the facing sheet F to conform with the shape of the cavity 81 to a certain degree prior to the stamp pressing. After stamp-pressing, the dies are opened by lifting up the upper die 8 and the vehicle 5 is lifted to the travel surface and started off the base 21 in the same manner as in the post-molding operations described above. The facing sheet F is formed of a larger size than the molded material M so that the hem portions of the facing sheet F protrude beyond the marginal edges of the molded material M after the stamp-pressing.

In the next stage, the carriage 5 is stopped at the trimming machine 3 and fixed on the base 31 in the same manner as in the case of the molding machine 1 and stamp press 2. After fixation, the cutter head 32 and trimming cutter 9 are lowered by the lift cylinder 33 to cut off the protruding hem portions of the facing sheet F around the marginal edges of the molded material M. The trimming cutter 9 is generally constituted by a cylindrical cutter body 91 with a heater wire 93 attached to its lower end by a number of support members 92 for thermally cutting the protruding hem portions of the facing sheet F. However, a cutter of any other type may be employed in the present invention.

Figure 11:
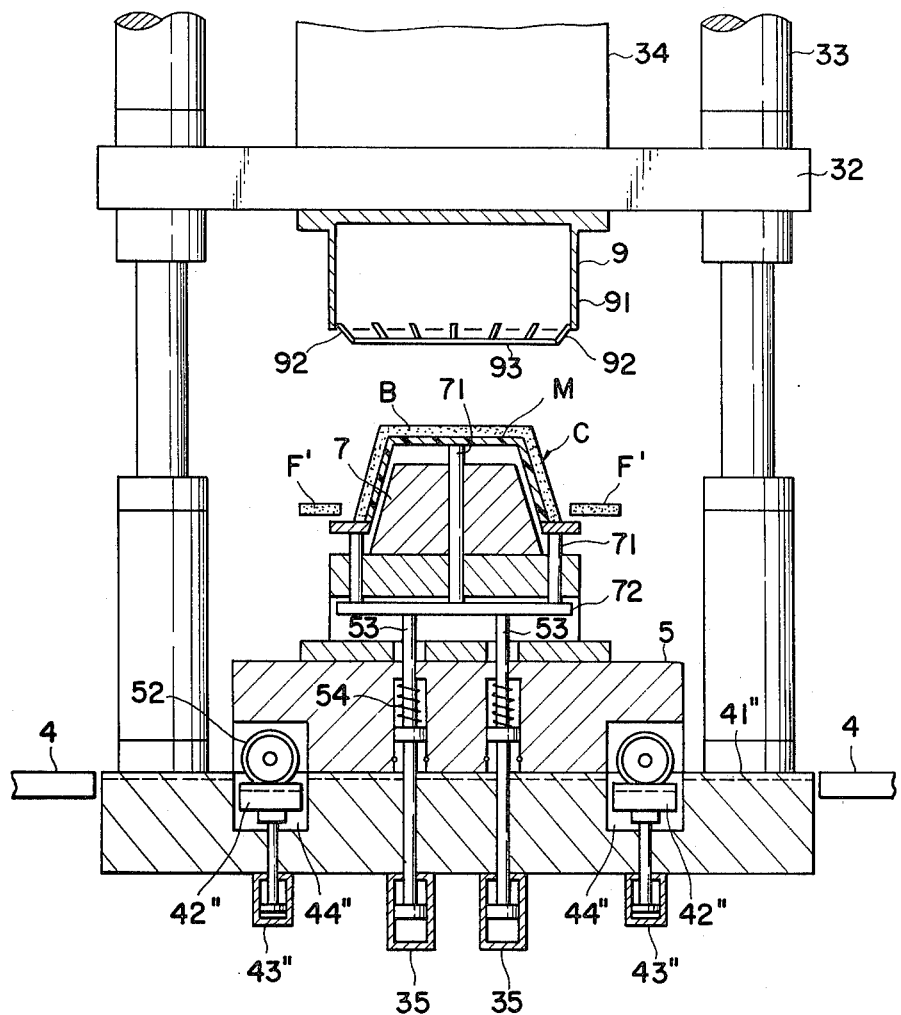
FIG. 11 is a vertically sectioned schematic front view of a trimming machine.

As illustrated particularly in FIG. 11, the base 31 of the trimming machine 3 is provided with a knock-out cylinder 35 in an opposing position relative to the knock-out pins 53 of the carriage 5 which is fixed on the base 31. After trimming the peripheral portions F' of the bonded facing sheet F, the knock-out pins 53 of the carriage 5 are pushed up by the knock-out cylinder 35, thereby pushing up the pin plate 72 and knock-out pins 71 of the lower die 7 to eject the product C with the facing sheet F bonded on the molded base material M. In the next phase, the movable rail segments 42" are lifted up to the level of the fixed rails 41" by the lift cylinder 43" to float up the vehicle 5 to the travel surface on the base 31. The motor 51 is then actuated to drive the vehicle wheels 52, moving the vehicle 5 out of the trimming machine 3 together with the lower die assembly 7. If desired, the product C may be ejected at a different station which is located ahead of the trimming machine 3.

The carriage 5 and lower die assembly 7 which have left the trimming machine 3 are moved into the molding machine 1 again and the next cycle of operation is performed by repeating the above-described operations. For this purpose, the floor rails are connected in an endless form such that the rails on the departure side of the trimming machine 3 are connected to the floor rails on the arrival side of the molding machine 1. Further, arrangements may be made such that, after leaving the trimming machine 3, the carriage 5 is once lowered by a lift (not shown) to return to the molding machine through an underground track, lifting up the vehicle again by a lift to enter the molding machine 1.

Figure 12:
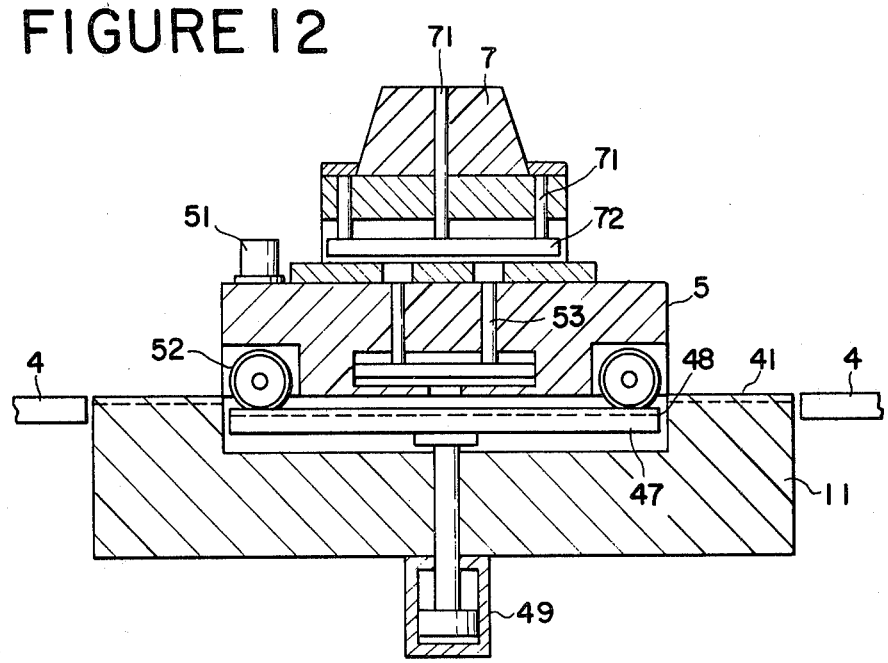
FIG. 12 is a vertically sectioned schematic front view of an injecting station base of a modified construction.

Alternatively, a lift plate 47 may be provided in the base 11 contiguously to paired rail segments 48 as shown in FIG. 12, lifting the carriage 5 up and moving it down by a single lift cylinder 49. Of course, the rail segments 42' and 42" of other bases 21 and 31 may be arranged in a similar manner if necessary. Further, the knock-out mechanism may be so arranged as to push up a plurality of knock-out pin 53 by a single knock-out cylinder.

FIG. 13 shows the steps in one cycle of operation by the systematized molding machine according to the present invention, which has advantages in the following respects.

According to the present invention, the injection molding of the base material, application of an adhesive, stamp pressing of a facing sheet F on the molded base material M and trimming are performed continuously in one cycle of systematized operation.

The lower die assembly of the injection molding machine is used commonly in the stamp press and trimming machine, so that a molded material on the lower die can be passed immediately to the next stage of operation as is even if it has not yet cooled a sufficient degree. The molded material at this time may have a temperature as required in the stage of predrying an applied adhesive or a preheating temperature $T_2$ as required in the stamp pressing stage, whichever is of a greater importance in a particular process. Consequently, it becomes possible to attain a higher energy effect and to shorten the cooling time as compared with the conventional method in which the molded material is first cooled to the ejecting temperature $T_1$ and then preheated to the level $T_2$.

Although the conventional injection molding machines have been required to have a die closing and opening stroke length twice as great as the height of the article to be molded, the present invention permits shortening the stroke to a minimum length which is necessary for the transfer of the lower die, for instance, to a length corresponding to the height of the molding plus 20 mm, since the molded article is conveyed from one station to another together with the lower die assembly.

The application of an adhesive may be omitted. In a case which necessarily includes an adhesive applying step, it is also possible to apply the adhesive to the molded material on the lower die assembly at a predetermined position on the way to the stamp press or to apply it to a molded material being transferred by the carriage, to thereby shorten the operating time even more. If the knock-out mechanism is provided on the lower die assembly, the product can be ejected therefrom while the carriage is being returned from the trimmer to the molding machine.

Figure 16:
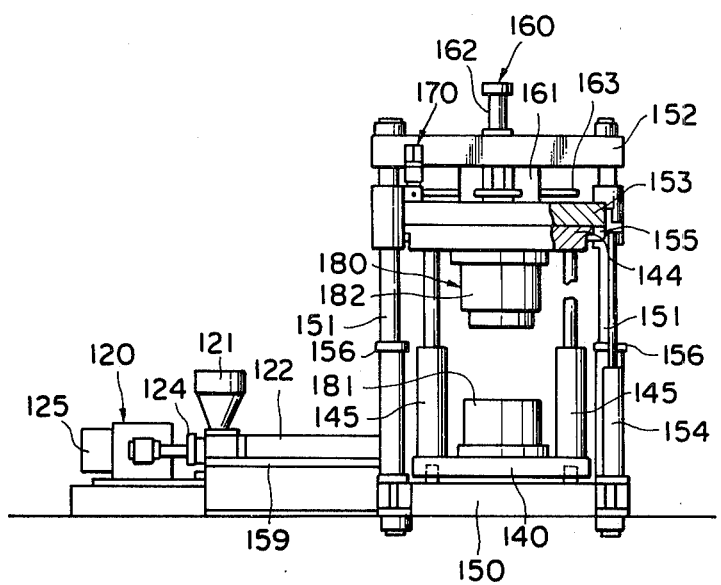
FIG. 16A is a schematic side view of the same molding machine.
FIG. 16B is an enlarged view showing the vehicle clamp 21.

Referring to FIGS. 14 to 16, there is shown another embodiment of the present invention, where two sets of dies which are mounted on a die carriage are alternately moved into an injecting station and one of forming stations provided on opposite sides of the injecting station. More specifically, the injection molding machine includes an injecting station A and forming stations B and B'. Provided at the injecting station A are a fixed plate 110, a die closing cylinder 113 supported on the fixed plate 110 by a number of tie rods 111 and a support plate 112, and a vertically movable die closing cylinder 115 which is connected to the ram 114 of the die closing cylinder 113, in front of an injector 120 including a hopper 121, a cylinder barrel 122, an injecting nozzle 123, an injecting hydraulic cylinder 124 and a hydraulic motor 125 for rotatingly driving an injecting screw.

Figure 16B:
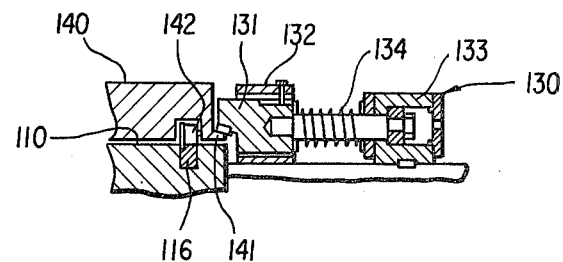

Provided on the fixed plate 10 are a rail track for a carriage 140 and a clamp mechanism 130 for releasably fixing the carriage 140 on the fixed plate 110. As shown particularly in FIG. 16B, the vehicle clamp 130 includes a clamp member 131 which is engageable with a locking member 141 on the part of the carriage 140, a guide member 132 for the clamp member 131, a clamping cylinder 133 and a return spring 134.

The die carriage 140 includes a plurality of travelling wheels 142 and a drive motor 143, and is reciprocatingly movable between the injecting station A and one of the forming stations B and B'. A couple of upper die mounting plates 144 and 144' are vertically movably mounted on the vehicle 140 by means of a plurality of lift cylinders 145 and 145'.

On the other hand, provided at the forming stations B and B' are a fixed plates 151 or 151' with rail tracks 157 or 157' for the carriage 140, a die closing plate 153 or 153' vertically movably supported on the fixed plate 150 or 150' by a number of tie rods 151 or 151' and a support plate 152 or 152' and a number of die closing cylinders 154 or 154' for lifting the movable plate 153 or 153' up and down. Mounted on top of the movable plates 153 and 153' are ejector mechanisms 160 and 160', respectively, each including an ejector box 161 or 161', an ejector cylinder 162 or 162' and an ejector plate 163 or 163'. Provided on the underside of the movable plates 153 and 153' are an upper die mounting plate 144 or 144' and a clamp member 155 or 155'. Downward movement of the movable plates 153 and 153' is limited by stoppers 156 and 156', respectively.

In operation, the lower dies 181 and 181' of a couple of die sets 180 and 180' are fixedly mounted on the carriage 140, while the upper dies 182 are fixedly mounted and 182' on the upper die mounting plates 144 and 144' by suitable fixing means (not shown). The fixation of the die sets 180 and 180' can be completed in a facilitated manner by the use of the die replacing table 159 or 159' with the die mounting portion of the carriage 140 positioned at the forming station B or B'.

In the next phase of operation, the drive motor 143 is actuated to move the carriage 140 to the right after closing the die sets 180 and 180' by lowering the upper die mounting plates 144 and 144' with upper dies 182 and 182'. As soon as the carriage 140 reaches a predetermined position with the die set 180 at the injecting station A and the other die set 180' at the forming station B, a position detector such as a limit switch (not shown) is actuated to stop the carriage 140 there and the clamping cylinder 133 of the carriage clamp mechanism 130 is operated to engage the clamping block 131 with the wedge portion 141 of the carriage 140, thereby fixing the carriage 140 at that position.

At the injecting station A, the die clamp cylinder 113 is then actuated to lower the ram 114 and movable plate 115 to close the die set 180, followed by advancement of the injecting nozzle 123 of the injector 120 to inject a plasticized resin in the cavity of the die set 180. Upon completion of injection, the injecting nozzle 123 is retracted away from the die set 180 and the ram 114 of the die clamp cylinder 113 is lifted up along with the movable plate 115 to relieve the die set 180 of its clamping force. However, the die set 180 is still held in the closed state by the lift cylinder 145 and upper die mounting plate 144 which are provided on the carriage 140.

After releasing the clamp force on the die set 180 at the injecting station A, the carriage clamp 130 is released and the motor 143 is actuated to move the carriage 140 to the left in the drawing. As soon as the carriage 140 reaches a predetermined position with the die set 180 located at the forming station B and the die set 180' at the injecting station A, the carriage is stopped at that position by operation of a position detector like a limit switch (not shown), fixing the carriage 140 again by operation of the carriage clamp mechanism 130. Simultaneously with the carriage clamping operation, the upper die mounting plate 144 of the die set 180 is clamped at its flange portion 144a by engagement with the clamp member 155.

Then, cooling water is supplied to the die set 180 at the forming station B, which is maintained in a closed state by the lift cylinder 145 and the upper die mounting plate 144, cooling the die set 180 for a predetermined time to cure the resin in a predetermined shape. Thereafter, the upper die mounting plate 144 and upper die 182 are lifted by operation of the die clamp cylinder 154 and lift cylinder 145 to open the die set 180, followed by ejection of the molded article from the die set 180 by actuation of the ejector cylinder 162 of the ejecting mechanism 160.

While the resin in the die set 180 is cured by cooling and is ejected therefrom at the forming station B, the other die set 180' at the injecting station A is clamped by the ram 114 of the die clamp cylinder 113 and the movable plate 115 in the same manner as described hereinbefore, and the injecting nozzle 123 is advanced to inject plasticized resin into the die set 180'. Upon finishing injection, the injecting nozzle 123 is retracted from the die set 180', and the ram 114 of the die clamp cylinder 113 is lifted up to release the die set 180'.

In the next stage, the carriage 140 is released again from the clamping force of the carriage clamp mechanism 130 and moved to the right into the position where the die set 180' is located at the forming station B and the die set 180 at the injecting station A, fixing the carriage 140 at that position by the carriage clamp mechanism 130. After the resin in the die set 180' at the forming station B' is cooled and cured in the same manner as described hereinbefore, the die set 180' is opened by operation of the die clamp cylinder 154' and lift cylinder 145', followed by ejection of the molding by the ejecting mechanism 160'. In the meantime, the die set 180 from which a molding has been ejected in a previous operation is clamped again at the injecting station A, thereafter repeating the above-described operations including injection of plasticized resin and release of the clamp.

In this manner, the carriage 140 is moved back and forth to shuttle one die set 180 between the injecting station A and one forming station B and the other die set 180' between the injecting station A and the other forming station B'. While one die set 180 or 180' undergoes clamping, resin injecting and unfastening operations at the injecting station A, the resin in the other die set 180' or 180 is concurrently cured by cooling and ejected at the forming station B' or B. Thus, the molding machine performs two different operations concurrently or in timewise overlapped relation.

The die set 180 and 180' are maintained in closed state by the lift cylinders 154 and 154' and upper die mounting plates 144 and 144', respectively, so that there is no possibility of resin leakage from the die set 180 and 180' even if the clamp is released immediately after injection of plasticized resin or during transfer from the injecting station A to the forming station B or B'. Consequently, the time period of each stop at the injecting station A can be shortened considerably.

Further, as the resin in the die set 180 and 180' is cured by cooling it the forming stations B and B' with the respective dies in closed state as mentioned hereinbefore, it can be correctly set to shape without distortions or the like. In addition, the upper die mounting plates 144 and 144' which respectively support the upper dies 182 and 182' are connected through the clamp members 155 and 155' to the movable plates 153 and 153' which are supported vertically movably on the tie rods 151 and 151', so that the die set 180 and 180' can be smoothly opened and closed by operation of the die clamp cylinders 154 and 154' and lift cylinders 145 and 145', coupled with the advantage that the molded articles can be ejected from the die set 180 and 180' in an accurate and efficient manner by the ejecting mechanisms 160 and 160'. The above-described arrangement also reduces the stopover time of the die sets 180 and 180' at the injecting station A. This and the concurrent injecting and curing operations have a synergistic effect of shortening the time period of molding cycle remarkably.

The lift cylinders 145 and 145' which hold the die sets 180 and 180' suffice to have a small output since no injection pressure is imposed during transfer of the dies, so that it is possible to employ compact and light-weight die holding mechanisms and carriage for the reduction of equipment costs.

Figure 18:
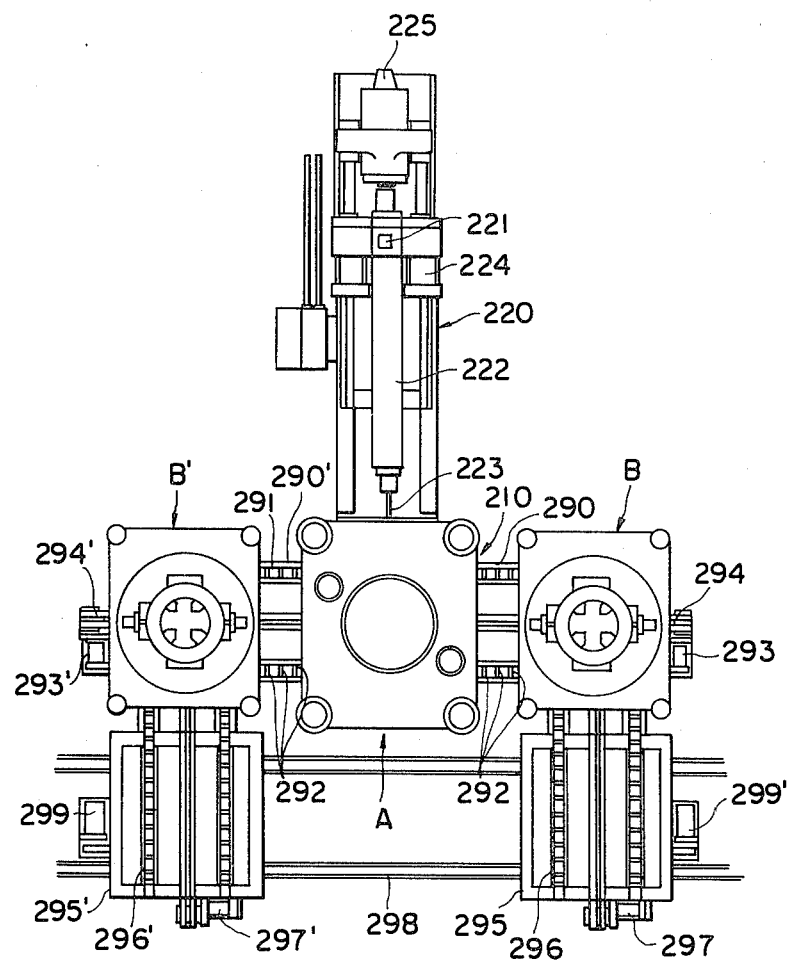
FIG. 18 is a schematic plan view of the molding machine shown in FIG. 17.

FIGS. 17 and 18 shows another embodiment employing a liftable slide roller mechanism 291 for guiding the movements of carriages 260 and 260' between an injecting station A and a forming station B or B'. Similarly to the foregoing embodiment, the injecting station A is provided with a main die clamp mechanism 210 including a fixed plate 211 with a die clamp mechanism 212, a die closing cylinder 215 supported on the fixed plate 211 by a number of tie rods 213 and a support frame 214, and a movable die closing plate 217 which is connected to the ram 216 of the die closing cylinder 215 for movement therewith. An injecting apparatus which is located behind the die clamp mechanism 210 similarly includes a hopper 221, a cylinder barrel 222, an injecting nozzle 223, an injecting hydraulic cylinder 224, and a hydraulic motor 225 for rotatingly driving an injecting screw.

Provided at the forming stations B and B' are a fixed plate 231 or 231', a movable die closing plate 234 or 234' which is supported on the base plate vertically movably by a number of tie rods 232 or 232' and a support plate 233 or 233', and a number of die closing cylinders 235 or 235' for lifting up and lowering the support plate 233 or 233'. Mounted on the movable plate 234 or 234' is an ejector mechanism 240 or 240' including an ejector plate 241 or 241' and an ejector cylinder 242 or 242' for lifting up and lowering the ejector plate 241 or 241'. Automatic clamps 236, 236', 237 and 237' are provided on the upper sides of the fixed plates 231 and 231' and on the lower sides of the movable plates 234 and 234' for fixing a couple of dies 250 and 250' each consisting of an upper die 251 or 251' and a lower die 252 or 252'.

The liftable slide roller mechanism 291 is provided on the upper surfaces of the fixed plate 211 of the injecting station A and of the fixed die closing plates 231 and 231' of the forming stations B and B' as well as on fixed frames connecting the respective forming stations with the injecting station. The liftable slide roller mechanism 291 includes a multitude of idle rollers 292 retained in a roller frame which is provided coextensively with the path of travel of the die carriages 260 and 260' and which is liftable above the upper side of the fixed die closing plates 211, 231 and 231' by a suitable lift mechanism (not shown) to expose the rollers on the fixed die closing plate to thereby support the die carriers 260 and 260' when they are moved between the injecting and forming stations. When fixing the dies, the rollers 292 are retracted into the fixed plates to let the bodies of the die carriages 260 and 260' rest on the fixed plates. The liftable slide roller construction serves to prevent inadvertent movement of the die carriages from predetermined stop positions and to protect the rollers 292 and carriages 260 and 260' against the die clamp forces. The carriages 260 and 260' are moved by geared motors 293 and 293' through chains 294 and 294', respectively.

In this embodiment, the molding machine is further provided with a die replacing mechanism in front of the injecting and forming stations A, B and B', including die transfer carriages 295 and 295', slide roller tracks 296 and 296' extended from the respective forming stations B and B' across the die transfer carriages 295 and 295', geared motors 297 and 297' for loading dies onto the carriages 295 and 295', rails 298 for transferring the carriages 295 and 295', and geared motors 299 and 299' for driving the die transfer carriages 295 and 295'.

The carriages 260 and 260' are each provided with a vertically movable upper die mounting plate 261 or 261' and a number of auxiliary die closing cylinders 262 and 262' (normally two or four cylinders). The lower dies 252 and 252' and upper dies 251 and 251' are fixed respectively on the carriages 260 and 260' and the upper die mounting plates 261 and 261' by suitable fixing means. The lower ends of cylinder tubes of the above-mentioned piston-cylinders 262 and 262' are securely fixed on the carriages 260 and 260', respectively. On the other hand, the upper die mounting plates 261 and 261' are provided with coupling members which are engageable with the upper ends of the piston rods 263 or 263' of the cylinders 262 and 262', and with a coupler operating mechanism for engaging and disengaging the coupling members. When opening the dies at the forming stations B and B', the coupling members are disengaged from the piston rods 263 and 263', respectively, to disconnect the upper die mounting plates 261 and 261' therefrom.

The operation and the resulting effects of the molding machine of FIGS. 17 and 18 are substantially the same as in the preceding embodiment except that the dies 250 and 250' are transferred between the injecting and forming stations separately by two carriages 260 and 260' which are driven by the geared motors 293 and 293' and in that the upper die mounting plate 261 is connected and disconnected from the piston rods 263 of the die closing cylinder 262 by operation of the coupling plates 265a and 265b of the coupler which are operated by an air cylinder or cylinders. The disconnected piston rods remains unlifted when the upper die mounting plate 261 with the upper die 251 is lifted up. Thus, the stroke length of the piston rods 263 can be reduced to a minimum without necessitating the employment of long cylinders the lower ends of which would have to protrude beneath the carriage 260.

Figure 19:
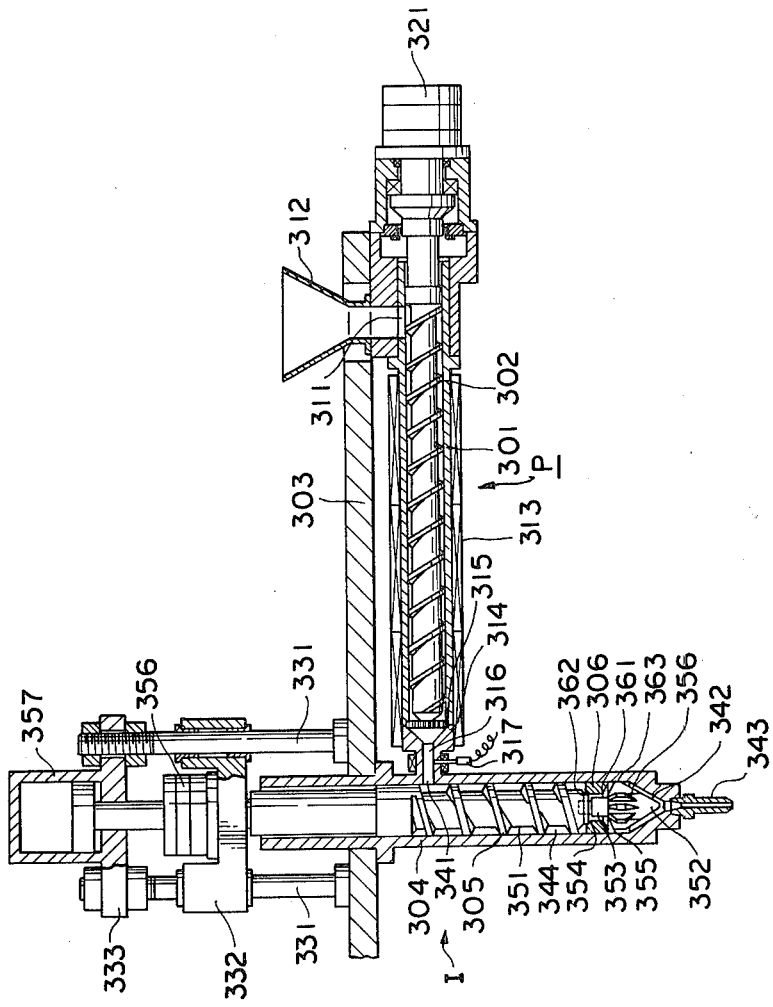
FIG. 19 is a vertically sectioned schematic view of an injector according to the present invention.
Figure 20:
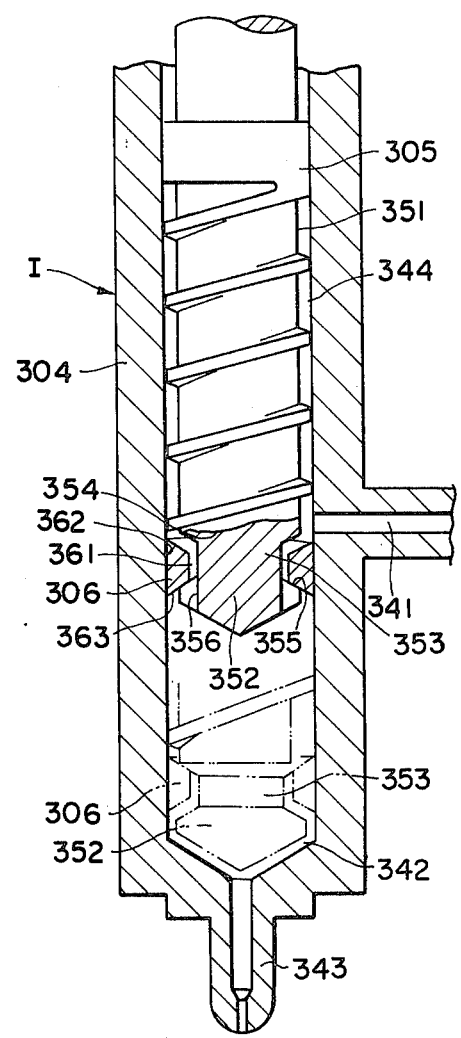
FIG. 20 is a vertically sectioned schematic view of an injecting plunger in a lifted position.

Referring to FIGS. 19 and 20, there is shown an injector which is suitable for use in the preceding embodiments and which includes a continuous plasticizing extruder P with a plasticizing screw 303 rotatably fitted in a cylinder 301 which is horizontally mounted on a fixed frame 302. The screw 303 is rotatingly driven from a hydraulic motor 321 which is mounted at the rear end of the cylinder 301. A hopper 312 is provided in communication with an inlet 311 of feed material which is formed in the rear top wall of the cylinder 301.

The cylinder 301 is further provided with a heater 313 around its circumference and has a breaker plate 315 attached to its fore end through an adaptor 314. A resin extruding hole 316 is formed in the distal end of the cylinder 301. If desired, the breaker plate 315 may be omitted. Indicated at 317 is a resin pressure detector.

The injecting assembly indicated at I includes an injecting chamber 304 which is mounted vertically or in an upright position on the fixed frame 302 and an injecting plunger 305 which is fitted in the chamber 304 rotatably and reciprocably in vertical direction or in the axial direction of the chamber 304. A resin inlet 341 which is formed through the circumferential wall of the chamber 304 substantially at an intermediate position between its upper and lower ends is connected to the resin outlet 316 at the fore end of the extruding cylinder 301 to communicate the chamber 304 with the latter. The injecting chamber 304 is provided with a metering portion 342 immediately upstream of an injecting nozzle 343 at the distal end of the chamber 304.

The injecting plunger 305 is of the screw type with a screw-like groove 351 on its circumference and has an injecting head 352 of a cone shape detachably fixed at its distal end. A non-return check ring 306 which is loosely fitted on a neck portion 353 of the injecting head 352 is axially displaceable, defining a resin pool 344 over a certain length in the axial direction together with the screw-like groove 351 on the circumference of the plunger 305 for holding the plasticized resin which is received through the resin inlet 341. In this instance, the screw-like groove 351 which is mainly intended for the transfer of the feed material is more deeply formed than the ordinary in-line screw and has a compression ratio in the range of 1.0 to 1.5.

The check ring 306 has an inside diameter larger than the outside diameter of the neck portion 53 to form an annular clearance 361 therebetween, and is formed with outwardly diverging tapered surfaces 362 and 363 at the upper and lower edges of its inner periphery opposingly to tapered surfaces 354 and 355 at the upper and lower edges of the neck portion 353. The injecting head 352 is further provided with a number of axial grooves 356 on the outer periphery thereof.

The rear or upper end of the injecting plunger 305 is connected to a hydraulic motor 356 which rotatingly drives the plunger 305 and to an injecting hydraulic cylinder 357 which imparts reciprocating axial movements to the plunger 305. The hydraulic motor 356 is mounted on a lift frame 332 which is vertically movable along tie rods 331, while the hydraulic cylinder 357 is mounted on a fixed frame at the upper ends of the tie rods 331.

In operation, a resin material is charged into the plasticizing cylinder 301 of the extruding assembly P through the hopper 312, rotating the plasticizing screw 302 by the hydraulic motor 321. The resin material is gradually plasticized in the cylinder 301 while it is fed forward (to the left in the drawing) by the operation of the screw 302, and extruded through the breaker plate 315 and resin extruding hole 316 which leads to the injecting chamber 304.

In this stage of operation, the injecting plunger 305 is initially in the upper retracted position as shown particularly in FIG. 20. Consequently, the plasticized resin admitted through the resin inlet 341 is fed to the metering portion 342 at the lower end of the chamber 304 through the passage between the tapered surfaces 354 and 362 at the fore end of the plunger 305 and the check ring 306, the annular clearance 361 and the grooves 356 on the head 352.

As soon as a predetermined quantity of resin material is received in the metering portion 342 in this manner, the injecting plunger 305 is lowered by the hydraulic cylinder 357 to inject the resin material in the metering portion 342 into a cavity of a die (not shown) through the head 352 and check ring 306. At this time, the tapered surface of the check ring 306 is pressed against the tapered surface 354 of the plunger 305 by the back pressure of the plasticized resin in the metering portion 342 to block communication between the metering portion 342 with the resin reservoir 344 across the check ring 306, so that there is no possibility of the plasticized resin in the metering portion 342 flowing in the reverse direction toward the resin reservoir 344 and extruding assembly P. The resin which is extruded through the resin outlet 316 of the extruding assembly P during the injecting operation is sent to and stored in the resin reservoir 344 above the check ring 306 through the resin inlet 341. Therefore, the extruding cylinder can be continuously put in operation without stopping during each injecting operation.

Upon completion of injection, the injecting plunger 305 is lifted up to a predetermined position by operation of the hydraulic cylinder 357 and, simultaneously with or after this upward movement, the injecting plunger 305 is rotated by the hydraulic motor 356 to feed to the metering portion 342 the plasticized resin stored in the resin reservoir 344, through the screw-like groove 351. At this time, the check ring 306 is lowered by its own weight and the resin pressure to communicate the resin reservoir 344 with the metering portion 342 automatically. Consequently, the plasticized resin in the reservoir 344 is fed into the metering portion 342 smoothly.

On the other hand, by the continued operation of the extruding assembly P, the plasticized resin which is incessantly extruded through the extruding hole 316 is fed into the resin reservoir 344 through its inlet 341 to join the plasticized resin in the reservoir 344 for supply to the metering portion 342. Namely, after an injecting operation, the metering portion 342 can be instantly filled with a predetermined amount of plasticized resin since the extruding assembly P continuously feed fresh plasticized resin into the reservoir 344 to join the material which has been stored there in the previous injecting operation. Therefore, it becomes possible to make intermittent injections of a short cycle time by repeating the foregoing operations with a continuous supply of plasticized resin from the extruding assembly P.

In the foregoing injection operation, should the resin reservoir 344 in the injecting chamber be filled to its capacity due to an abnormally long time interval of injection, for example, a time interval necessitated by an unexpectedly long cooling time, a corresponding increase in the resin pressure is detected by the pressure detector 317 which is provided in the passage between the resin extruding hole 316 and the inlet 341 to the resin reservoir 344, stopping the rotation of the plasticizing screw 302 according to the signal from the detector 317 to ensure safe operation. Alternatively, a hydraulic cylinder may be provided in the extruding assembly P in a manner similar to the in-line screw injector, thereby retracting the plasticizing screw 302 which is rotating (plasticizing) when the injecting chamber 304 becomes full.

Although a single extruder is connected to a injector in the particular embodiment shown, there may be employed more than one extruder for the injector.

As clear from the foregoing description, this injector solves the problems of the conventional counter parts, for example, problems connected with the floor space and maintenance, and is simple in construction, avoiding the necessity of top valves or switch means as required in the conventional preplasticizing type injectors. Especially, the injector construction having an extruding assembly perpendicularly connected to an injecting assembly with a non-return check ring in association with a metering portion and a resin reservoir makes it possible to shorten the cycle time and thus to enhance the operating efficiency of the molding machine by the continuous operation of the extruder, as is the object of the present invention.

Figure 21B:
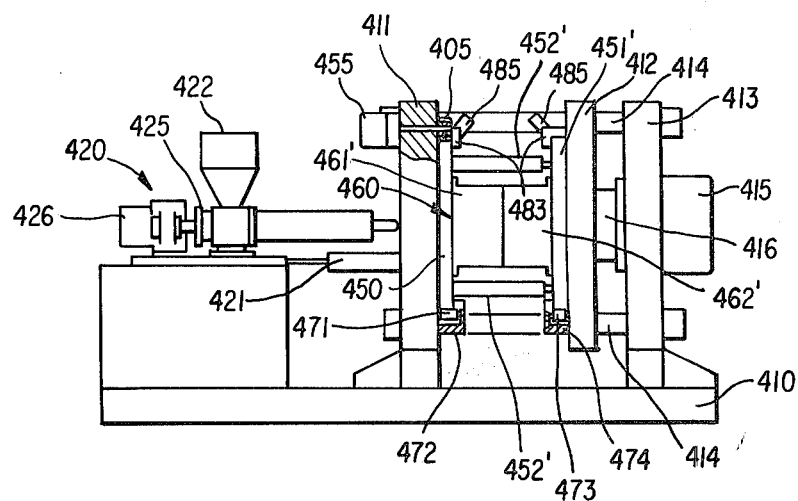
FIG. 21B is a further view of the horizontal injection molding machine shown in FIG. 21A.
Figure 23:
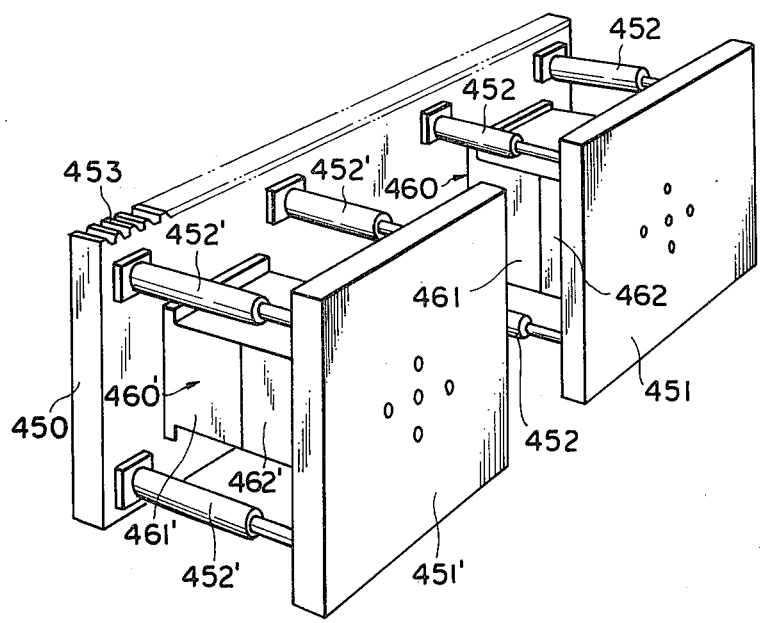
FIG. 23 is a perspective view of a die transfer plate.

Referring now to FIGS. 21 to 23, there is shown a horizontal type injection molding machine incorporating the present invention, which likewise has an injecting station A and forming stations B and B'. Provided at the injecting station A are a fixed plate 411 and a cylinder frame 413 which are mounted in spaced upright positions on a base 410 and connected with each other at the respective four corners by tie rods 414, the cylinder frame 413 mounting thereon a die closing cylinder 415. An upright movable plate 412 which is disposed parallel with the fixed plate 411 is connected to a ram 416 of the die closing cylinder 415 is thereby moved back and forth under the guidance of tie rods 414 at the four corners thereof. Indicated at 420 is an injector which is movable toward and away from the front side of the fixed plate 411 by means of a piston-cylinder 421, and includes a hopper 422, a cylinder barrel 423, an injecting nozzle 424, an injecting hydraulic cylinder 425 and a hydraulic cylinder 426 for rotatingly driving an injecting screw.

Provided at the forming stations B and B' are a fixed plate 431 or 431' and another fixed plate 433 or 433' which are erected in upright positions on the base 410 and disposed parallel with each other. A movable plate 432 or 432' is slidably supported at its four corners on guide rods 434 or 434' which are bridged between the opposing corners of the fixed plates 431 or 431' and 432 or 433', the movable plate 432 or 432' being movable back and forth in an upright state parallel with the fixed plates by adjustor cylinders 435 which adjust the space between the fixed movable plates according to the thickness of the die to be mounted. The movable plates 432 and 432' have mounted thereon an ejector mechanism 440 or 440' including an ejector box 441 or 441', an ejector cylinder 442 or 442' and an ejector plate 443 or 443'.

Designated at 450 is a die transfer plate which is mounted in an upright position and which is movable back and forth along the inner surfaces of the fixed plates 431 and 431'. The die transfer plate 450 has a couple of movable die mounting plates 451 and 451' mounted at two spaced positions on its inner surface. The movable plates 451 and 451' are movable back and forth by means of four die closing cylinders 452 and 452'. Fixed die halves 461 and 461' of die sets 460 and 460' are detachably mounted on the die transfer plate 450, while movable die halves 462 and 462' are detachably mounted on the movable die mounting plates 451 and 451', respectively, by suitable fixing means to permit opening and closure of the dies 460 and 460'.

For moving the die transfer plate 450 back and forth, the embodiment which is particularly shown in FIGS. 21 to 23 employs a rack 453 along the upper edge of the plate 450 in engagement with a pinion 454 which is provided on the fixed plate 411 and driven from a reversible motor 455, reciprocating the die transfer plate 450 toward and away from each forming station by reversing the direction of the drive motor 455. Of course, the rack and pinion drive may be replaced by other drive means if desired.

The lower side of the die transfer plate 450 is supported on a multitude of guide rollers 471 which are rotatably retained in a fixed support frame 472 provided on inner lower end portions of the fixed plates 411, 431 and 431'. The lower side of the movable die mounting plates 451 and 451' are similarly supported on a multitude of guide rollers 472 which are rotatably retained in a movable support frames 471, 475 and 476 provided on inner lower end portions of the movable plates 432 and 432'.

In the upper and lower portions on the opposing inner faces of the fixed plates 411 and movable plate 412 as well as on the opposing inner faces of the fixed plates 431, 431' and movable plates 432, 432', there are provided holder strips 481, 482, 483 and 484 of L-shape in section which disengageably engage the upper and lower edges of the die transfer plate 450 and movable die mounting plates 451 and 451' and of which the upper holder strips 481 and 483 are provided with clamps 485 and 486.

In operation, after closing the dies 460 and 460' by pushing the movable die mounting plates 451 and 451' and the movable dies 462 and 462' with the die closing cylinders 452 and 452', the drive motor 455 is actuated to move the die transfer plate 450 to the left through the pinion 454 and rack 453. When the die transfer plate 450 reaches a predetermined position, it is engaged by the holder strips 481 and 482, and the movable die mounting plates 451 and 451' are engaged by the holder strips 483 and 484. As soon as the dies 460 and 460' are positioned at the forming and injecting stations B and A, respectively, the drive motor 455 is stopped by a position detector such as a limit switch (not shown) and clamps 485 and 486 are operated to clamp the die transfer plate 450 and the movable die mounting plates 451 and 451' to the fixed plates 431' and 411 and movable plates 432 and 412.

Thereafter, the die clamp cylinder 415 is actuated at the injecting station A, advancing the ram 416 and movable plate 412 to clamp the die 460'. Then, the injector 420 is moved forward by the cylinder 421 to connect the injecting nozzle 424 with the die 460' and inject a plasticized resin thereinto. Upon completion of injection, the injecting nozzle 424 is retracted to disengage from the die 460', and the ram 416 of the die clamp cylinder 415 and the movable plate 412 are also retracted to release the die. In this instance, however, the die 460' is retained in a closed state by the die closing cylinder 452' and movable die mounting plate 451' which are provided on the die transfer plate 450.

On the other hand, the die 460 at the forming station B, which is held in closed state by the die closing cylinder 452, movable die mounting plate 451, adjusting cylinder 435 and movable plate 432, is connected to a cooling water supply means (not shown) to receive a supply of cooling water to thereby cure in a predetermined shape a resin material which has been injected into the die 460 at the injecting station A in a previous cycle of injecting operation. Thereafter, the die closing cylinder 452 and adjusting cylinder 435 are operated to retract the movable plate 432, movable die mounting plate 451 and movably retract the movable plate 432, movable die mounting plate 451 and movable die 462 away from the fixed die 461 to open the die 460, ejecting the cured molding by operation of the ejector cylinder 440. After ejection of the molding, the cylinders 452 and 435 are operated to again close the die 460.

In this manner, while the die 460' undergoes clamping, injection and release of clamp at the injecting station A, the resin material in the die 460 is cooled and the resulting molding is ejected at the forming station B.

In the next stage of operation, the clamps 485 and 486 are released to free the die transfer plate 450 and movable die mounting plates 451 and 451', actuating the drive motor 455 to translate the die transfer plate 450 to the right rhrough the pinion 454 and rack 453 to position the die 460' this time at the forming station B' and the die 460 at the injecting station A. As soon as the die transfer plate 450 reaches a predetermined position, a limit switch or other position detector is actuated to stop the drive motor 455 and to then fix the die transfer plate 450 and the movable die mounting plate 451 and 451' to the fixed plate 411 and 431' and to the movable plates 412 and 432 by the clamps 485 and 486. At the forming station B', after curing the resin in the die 460' by cooling in the same manner as described hereinbefore, the die 460' is opened by operation of the die closing cylinder 452' and adjusting cylinder 435' to permit ejection of the cured molding by the ejector mechanism 440'. In the meantime, at the injecting station A, the die clamping, injecting and clamp releasing operations are performed on the die 460 which was at the forming station B in the previous operation for curing and ejection of the injected material.

Thereafter, the same operations are repeated to produce moldings efficiently with a remarkably shorted cycle time. As will be understood from the foregoing description, the horizontal type molding machine also enjoys the advantages of the present invention as mentioned hereinbefore.

What is claimed as new and desired to be secured by Letters Patent of the United States is:

1. An injection molding machine comprising;
   (a) a first station for injecting a plasticized material into a die cavity, said first station including a molding machine and a first die half which serves exclusively in said first station;
   (b) a second station for joining facing sheets to the articles produced by said first station, said second station including a stamp press and a second die half which serves exclusively in said second station;
   (c) at least two third die halves, each of which is sized and shaped to cooperate with both said first and said second die halves;
   (d) a third station for trimming excess facing sheet material from the articles produced by said second station, said third station including a trimming cutter which conforms to said third die halves;
   (e) at least two die carriages movable among said first, second, and third stations, each of said die carriages fixably supporting thereon one of said third die halves;
   (f) means for guiding movement of said carriages between and through said first, second, and third stations;

(g) carriage clamp means at each of said first, second, and third stations for selectively fixing said die carriage therein;

(h) first closing means at said first station for releasably clamping said first die half and one of said third die halves together;

(i) second closing means at said second station for releasably clamping said second die half and one of said third die halves together; and (j) third closing means at said third station for moving said trimmer cutter into position to trim excess facing sheet material from the article produced by said second station.

2. An injection molding machine as recited in claim 1 wherein:

(a) said die carriages are wheeled and (b) said means for guiding movement of said carriages are rail tracks.

3. An injection molding machine as recited in claim 2 wherein a segment of said rail tracks in at least said first and second stations is movable between:

(a) a retracted sunken position in which the bottom of one of said die carriages located in that station is supported on a fixed base in said station and the force of the associated one of said closing means is accordingly not borne by the wheels of said die carriage and (b) a lifted position level with the adjacent portions of said rail tracks.

4. An injection molding machine as recited in claim 1 wherein each of said die carriages further comprises a plurality of ejector pins which cooperate with an ejector pin plate in the associated one of said third die halves.

5. An injection molding machine as recited in claim 4 wherein said third station further comprises at least one ejector cylinder for actuating said ejector pins in said die carriages.

6. An injection molding machine as recited in claim 1 wherein each of said die carriages further comprises a fluid passage for selectively supplying cooling water, water-purging air, and heating steam to the associated one of said third die halves.

7. An injection molding machine as recited in claim 1 wherein said die carriages are motor-driven, wheeled carriages.

8. An injection molding machine as recited in claim 1 wherein said die carriages are chain-driven, wheeled carriages.

9. An injection molding machine as recited in claim 1 which comprises three die carriages, whereby one die carriage can be fixed in and operated upon in each of said three stations simultaneously.

10. An injection molding machine as recited in claim 1 wherein said first and second closing means each comprises:

(a) a fixed support plate and (b) a vertically movable die closing plate disengageably connected to said fixed support plate and to said first and second die halves, respectively.

11. An injection molding machine as recited in claim 1 wherein said second station further comprises a die replacing table to one side of said stamp press.

12. An injection molding machine as recited in claim 11 and further comprising a guide track laid in front of said second station perpendicular to the path of motion of said die carriages between said first and second stations to facilitate die replacement.

13. An injection molding machine as recited in claim 1 and further comprising first and second forming stations located on opposite sides of said first station for curing the injected resin material in a predetermined shape.

14. An injection molding machine as recited in claim 1 wherein said means for guiding movement is a slide roller track provided among and through said stations.

15. An injection molding machine as recited in claim 1 wherein said first and second closing means each comprises a plurality of tie rods, a movable die closing plate, and a fixed support plate securely mounted on top of said plurality of tie rods, said movable die closing plate being movable along said plurality of tie rods.

16. An injection molding machine as recited in claim 1 wherein said die carriages are movable by means of a gear motor.

17. An injection molding machine as recited in claim 1 wherein said die carriages are movable by means of a reversible motor.

18. An injection molding machine as recited in claim 1 wherein said molding machine comprises:

(a) a continuous plasticizing extruder including a horizontal plasticizing cylinder and a plasticizing screw rotatedly fitted in said plasticizing cylinder;

(b) an injecting assembly including a vertical cylindrical injecting chamber with an injecting nozzle at the lower distal end thereof, an injecting plunger received in said injecting chamber movably up and down in the axial direction thereof, and a lift mechanism connected to said injecting plunger for moving said injecting plunger axially in said injecting chamber; and (c) an extruder assembly having a resin inlet formed in the circumferential wall of said injection chamber at a position intermediate between the upper and lower ends thereof.

19. An injection molding machine as recited in claim 18 wherein said injection plunger has a non-return ring fitted loosely on a neck portion in the fore end portion thereof, said non-return ring defining a resin reservoir downstream of said resin inlet and between the circumferential surface of said injecting plunger and the inner periphery of said injecting chamber.

* * * * *

UNITED STATES PATENT AND TRADEMARK OFFICE
CERTIFICATE OF CORRECTION

PATENT NO. : 4,439,123
DATED : MARCH 27, 1984
INVENTOR(S) : TSUTOMU SANO ET AL

It is certified that error appears in the above—identified patent and that said Letters Patent is hereby corrected as shown below:

Column 8, line 31, insert "and 182'" after --182--.

Column 8, line 32, delete "and 182'".

Column 14, line 29, change "415 is" to --415 and is--.

Column 14, line 45, change "432" to --433--.

Column 16, line 18, change "rhrough" to --through--.

Column 16, lines 24 and 25, change "plate" to --plates--.

Signed and Sealed this

Twenty-ninth Day of January 1985

[SEAL]

Attest:

DONALD J. QUIGG

Attesting Officer    Acting Commissioner of Patents and Trademarks